United States Patent
Pluta et al.

(10) Patent No.: US 9,114,733 B2
(45) Date of Patent: Aug. 25, 2015

(54) VEHICLE SEAT

(75) Inventors: Wolfgang Pluta, Heiligenmoschel (DE); Thomas Bingert, Otterbach (DE); Thomas Christoffel, Herschweiler-Pettersheim (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 114 days.

(21) Appl. No.: 13/819,460

(22) PCT Filed: Aug. 1, 2011

(86) PCT No.: PCT/EP2011/003857
§ 371 (c)(1),
(2), (4) Date: May 9, 2013

(87) PCT Pub. No.: WO2012/028235
PCT Pub. Date: Mar. 8, 2012

(65) Prior Publication Data
US 2013/0221720 A1    Aug. 29, 2013

(30) Foreign Application Priority Data
Sep. 2, 2010    (DE) .......................... 10 2010 044 654

(51) Int. Cl.
*B60N 2/06* (2006.01)
*B60N 2/07* (2006.01)
*B60N 2/14* (2006.01)

(52) U.S. Cl.
CPC *B60N 2/062* (2013.01); *B60N 2/06* (2013.01); *B60N 2/074* (2013.01); *B60N 2/0745* (2013.01); *B60N 2/14* (2013.01)

(58) Field of Classification Search
CPC ............................. B60N 2/062; B60N 2/0737
USPC .................. 297/344.1, 344.24; 248/429, 430;
296/65.11, 65.13
See application file for complete search history.

(56) References Cited

U.S. PATENT DOCUMENTS

| 2,670,028 A | * | 2/1954 | Doty et al. ..................... 248/425 |
| 2,681,687 A | * | 6/1954 | Haltenberger ................. 248/425 |
| 2,851,083 A | * | 9/1958 | Rhodes .......................... 297/341 |

(Continued)

FOREIGN PATENT DOCUMENTS

| DE | 3920454 A1 | 1/1991 |
| DE | 10056757 A1 | 6/2002 |
| DE | 102006022732 A1 | 11/2007 |
| DE | 102006037344 A1 | 2/2008 |
| DE | 1020080 12 376 A1 | 9/2009 |
| DE | 102009033494 A1 | 1/2011 |
| DE | 102010044654 A1 | 3/2012 |

OTHER PUBLICATIONS

International Search Report for International Application No. PCT/EP2011/003857 and English translation, date of mailing Sep. 17, 2012, 5 pages.
Translation of International Preliminary Report on Patentability (IPRP), in PCT/EP2011/003857 dated Mar. 14, 2013.

*Primary Examiner* — Peter Brown
(74) *Attorney, Agent, or Firm* — Foley & Lardner LLP

(57) ABSTRACT

A vehicle seat can be moved from a starting position to a laterally offset end position and back, and the vehicle seat is oriented in the same direction in the starting position and in the end position. The vehicle seat includes a first upper rail, which is movably guided in a first lower rail, a second upper rail, which is movably guided in a second lower rail, and a seat cushion, which is movably mounted on the at least one upper rail. The lateral motion of the seat cushion relative to the rails is accomplished by carrying out a predetermined relative motions of the rails.

8 Claims, 10 Drawing Sheets

(56) References Cited

U.S. PATENT DOCUMENTS

Figure 1:
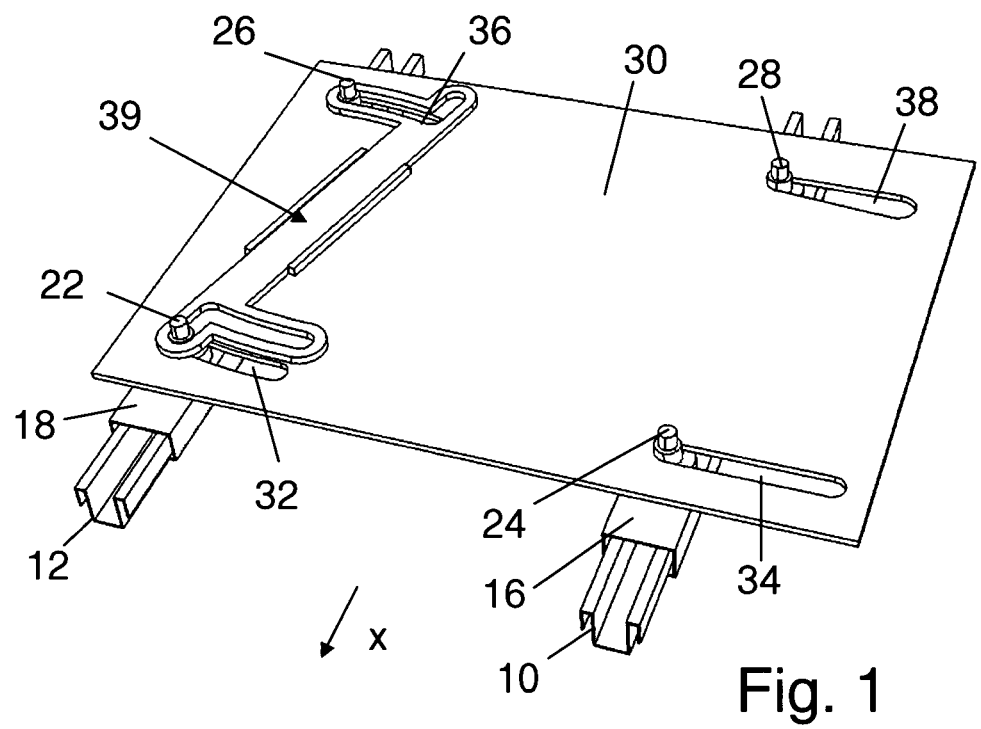

| | | | |
|---|---|---|---|
| 3,013,837 A * | 12/1961 | Pessl et al. | 296/68.1 |
| 3,933,331 A * | 1/1976 | Blom | 297/344.1 |
| 4,113,223 A * | 9/1978 | Kakizaki | 248/430 |
| 5,529,275 A * | 6/1996 | Cornell | 248/429 |
| 6,027,170 A * | 2/2000 | Benz et al. | 297/344.21 |
| 7,708,331 B2 * | 5/2010 | Yamasaki | 296/65.13 |
| 7,992,914 B2 * | 8/2011 | Maier et al. | 296/65.13 |

* cited by examiner

VEHICLE SEAT

CROSS REFERENCE TO RELATED APPLICATIONS

The present application is a National Stage of International Application No. PCT/EP2011/003857 filed on Aug. 1, 2011, which claims the benefit of German Patent Application No. 10 2010 044 654.8 filed on Sep. 2, 2010, the entire disclosures of which are incorporated herein by reference.

The invention relates to a laterally displaceable vehicle seat.

Vehicle seats which comprise a rail system, by means of which the vehicle seat is displaceable for longitudinal adjustment in the direction of travel as well as counter to the direction of travel, are generally known. In this case, such a rail system comprises two lower rails extending parallel to one another in the direction of travel, said lower rails being fastened to the vehicle floor. Two upper rails which are each movably guided in one respective lower rail, together carry a seat shell.

A vehicle seat substructure comprising a transverse guide is disclosed in DE 10 2008 012 376 A1, in which the vehicle seat is laterally displaceable by means of the transverse guide. In this case, the vehicle seat substructure may also comprise in the known manner rail pairs arranged below said substructure, said rail pairs forming a longitudinal guide. The longitudinal guide and transverse guide are in this case independent of one another.

A seat comprising a seat part and a seat substructure is disclosed in DE 10 2006 037 344 A1, wherein the seat part is displaceable along a transverse axis relative to the seat substructure and at least partially pivotable about the transverse axis. In this case, a displaceable element is provided with a lower part arranged fixed to the vehicle and an upper part, said displaceable element forming a part of the substructure. The transverse movement, together with a pivoting movement to the front, are activated by folding forward the backrest and serve, in particular, for increasing the stowage space.

DE 10 2006 022 732 A1 reveals a similar seat to DE 10 2006 037 344 A1 but without the pivoting movement.

The object of the invention is to improve a vehicle seat of the aforementioned type.

This object is achieved according to the invention by a vehicle seat having the features of claim 1.

Advantageous embodiments of the invention form the subject-matter of the dependent claims.

In this case, a vehicle seat which may be moved from a starting position into a laterally offset end position and back again is provided, wherein the vehicle seat is oriented in the same direction both in the starting position and in the end position. In this case, the vehicle seat is preferably oriented to the front at least approximately in the direction of travel. The directional information in this case refers to the normal direction of travel. The vehicle seat comprises at least one upper rail which is movably guided in a lower rail and a seat cushion which is movably mounted on the upper rail. The lateral movement of the seat cushion and thus of the vehicle seat relative to the rails according to the invention is accomplished by carrying out a predetermined forward and/or rearward direction of the upper rail, i.e. a forward movement and/or a rearward movement of the upper rail effects a movement of the seat cushion which takes place obliquely thereto, in particular preferably at right angles thereto.

Preferably, in this case the seat cushion is fastened to a support which is fixed to the seat structure and which bears against the at least one upper rail and is movably mounted on the at least one upper rail.

By means of the invention it is provided, in particular, to arrange two upper rails displaceably relative to one another. This relative displaceability of the upper rails to one another is utilized for the lateral displaceability of the vehicle seat, i.e. by means of a relative movement of the two upper rails of the vehicle seat which are arranged in parallel, a lateral movement thereof is able to be carried out. However, a conventional longitudinal adjustment of the vehicle seat is able to be carried out by a uniform movement of the two upper rails.

According to a variant it is provided that by the relative movement of the first upper rail to the second upper rail, a support which bears against the upper rails carries out a first rotation about a vertically extending axis. A seat cushion, which is preferably fixedly connected to the support, thus carries out the same rotation. In a second step, a second rotational movement take place about a second vertically extending axis in the opposing direction so that the seat cushion in turn carries out a corresponding rotation. By the superimposition of the two rotations about axes which are spaced-apart, the seat cushion is displaced in the lateral direction, i.e. in or transverse direction. As the support on the second upper rail is rotatably mounted on the second upper rail for carrying out a first rotational movement in a first rotational direction about a first axis, and also for carrying out a second rotational movement which may be carried out chronologically after the first rotational movement, in a second rotational direction which opposes the first rotational direction, about a second axis which is positioned spaced apart from the first axis, and the two axes are oriented extending parallel to one another and in the vertical direction relative to the vehicle seat, by means of the two rotational movements a lateral displacement may be implemented in which the two upper rails are moved from a starting position at the same height into an end position at the same height, wherein the initial and end positions correspond to one another. This has the advantage that in the end position the entire length of the longitudinal adjustability of the rails may be utilized and the maximum longitudinal adjustability is not impaired by upper rails at different heights.

In a particularly preferred manner, the first and the second rotational movements have the same angular range but run in opposing directions.

The support preferably comprises: a first recess through which a first pin fastened to the second upper rail protrudes, a second recess through which a second pin fastened to the first upper rail protrudes, and a third recess through which a third pin fastened to the second upper rail protrudes, wherein the second and third recesses are formed as sliding tracks such that with a displacement of the first upper rail relative to the second upper rail in the longitudinal direction a rotation of the support is possible about the center axis of the first pin. By providing corresponding pins serving as sliding blocks and recesses serving as sliding tracks, the rotational movements effected by a longitudinal adjustment of one of the upper rails may be implemented by a simple construction.

In a particularly preferred manner, the second and third recesses are configured as sliding tracks such that with a rearward displacement of the first upper rail relative to the second upper rail in the longitudinal direction it is possible to rotate the support back around the center axis of the third pin.

The reversal of the rotational movements by altering the rotational axis may be ensured in a simple manner by a bar forming a locking mechanism which is displaceable in a direction which is defined by the end position of the center axis of the first pin in the first recess at the end of the first rotational movement and the starting position of the center axis of the third pin in the third recess before the start of the second rotational movement. In a particularly preferred manner, the bar has at its end regions curved tracks which in each case have a short linear region extending parallel to the direction of displacement of the bar, as well as two circular arc-shaped regions extending in each case in a direction perpendicular to said region extending in a linear manner, wherein the two circular arc-shaped regions in each case extend on different sides of the bar and have a radius which corresponds to the distance from the outer end of the linear region as far as the inner end of the second linear region.

As an alternative to a bar, a locking mechanism may be provided which is formed by two compression springs, which are alternately acted upon during the two rotational movements in order to secure the first pin in terms of rotation in the first recess initially during the first rotational movement, and in order to secure the third pin in terms of rotation in the third recess subsequently during the second rotational movement.

It is preferred during both rotational movements that the first upper rail is fixed to the first lower rail, i.e. the second upper rail is exclusively moved. In this case, during the first rotational movement the second upper rail is displaceable relative to the second lower rail to the rear, with regard to the normal orientation of the vehicle seat in a vehicle, and during the second rotational movement is displaceable again to the front, back into the starting position, during which the vehicle seat is laterally displaceable by two rotational movements about different axes.

Naturally, it is also conceivable that during the first rotational movement the second upper rail is displaceable relative to the second lower rail to the front, with regard to the normal orientation of the vehicle seat in a vehicle, and during the second rotational movement is displaceable again to the rear, back into the starting position, during which the vehicle seat is able to be laterally displaced by two rotational movements about different axes.

According to an alternative embodiment, the lateral movement may also be effected by a simple forward or rearward movement of one of the two upper rails. This has the advantage of a considerably simpler geometry and a simpler motion sequence.

Preferably, in this case the support is guided by means of sliding tracks formed by slotted recesses in combination with sliding blocks fixed to the upper rails, wherein the orientation of the sliding track(s) on the side of the first upper rail differs from the orientation of the sliding track(s) on the side of the second upper rail, and two sliding tracks corresponding to one another are formed on the side of the first and/or second upper rail and a total of at least three sliding tracks is provided. In this case, it is sufficient if one sliding track is provided on one side and two sliding tracks are provided on the other side, but it is preferred if in each case two sliding tracks are provided on both sides.

Preferably, the sliding track(s) is(are) arranged on the side of an upper rail perpendicular to the longitudinal direction of the upper rail. The sliding track(s) on the side of the other upper rail is(are) arranged obliquely thereto, preferably in an angular range of between 30 and 60° to the longitudinal direction of the upper rail and, in particular, preferably ca. 45° to the longitudinal direction of the upper rail.

At least one motor is preferably provided for driving the upper rail which is moved, wherein both upper rails are preferably able to be driven by one respective motor, so that for example even during a longitudinal adjustment of the vehicle seat a lateral adjustment thereof is possible.

Figure 2:
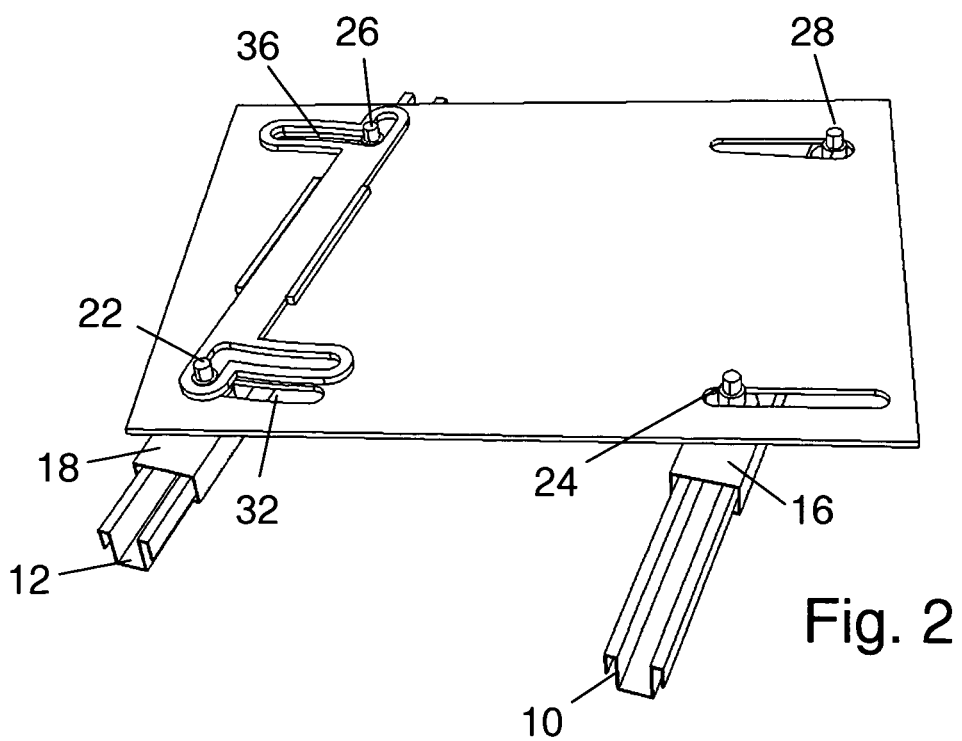
Figure 3:
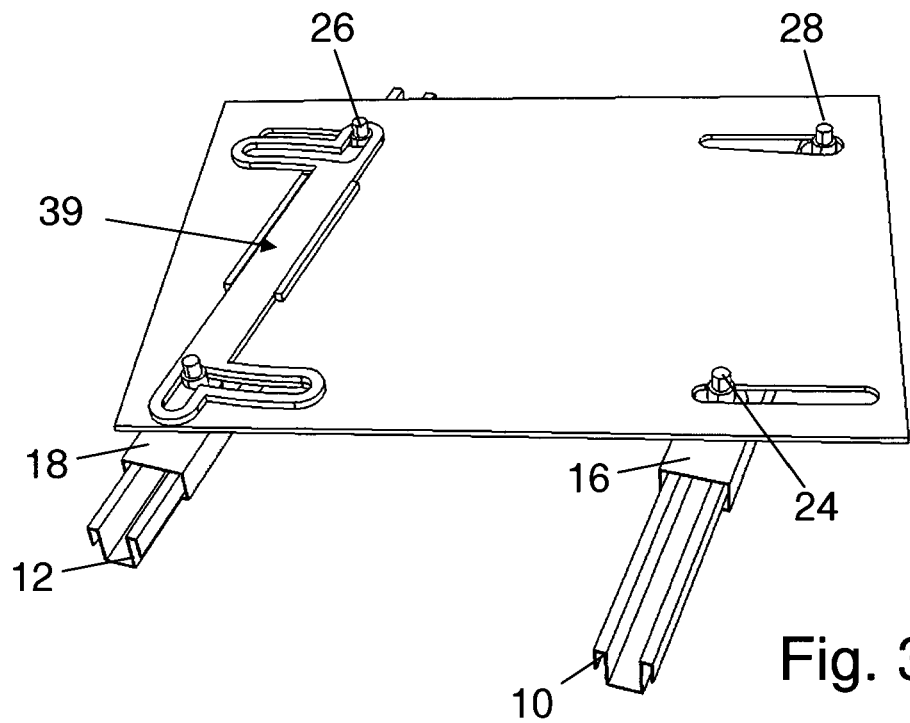
Figure 4:
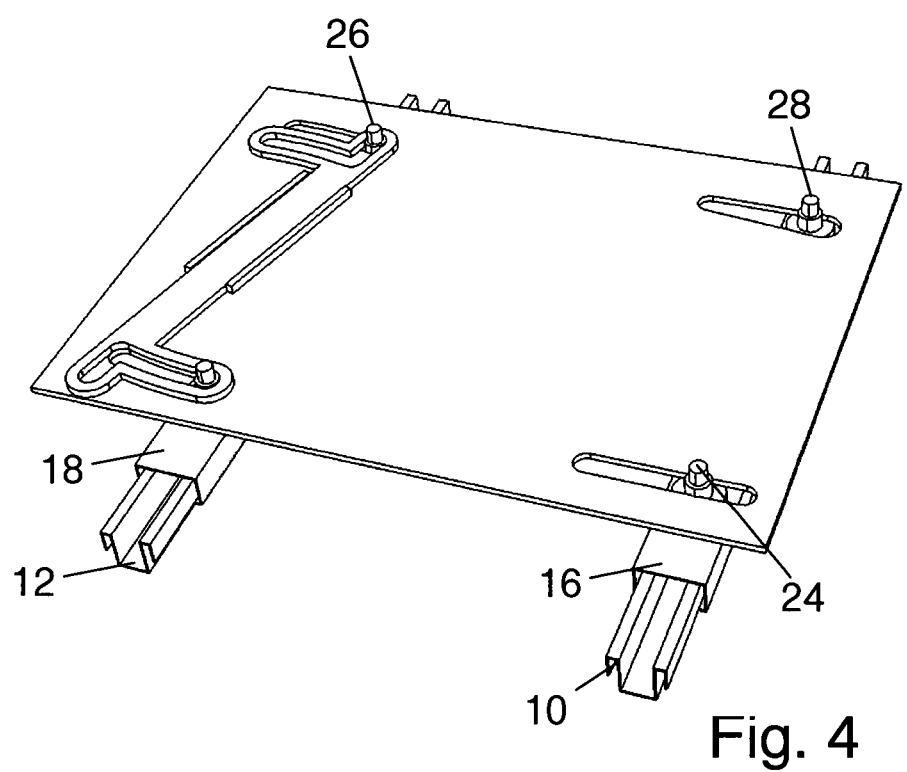
Figure 5:
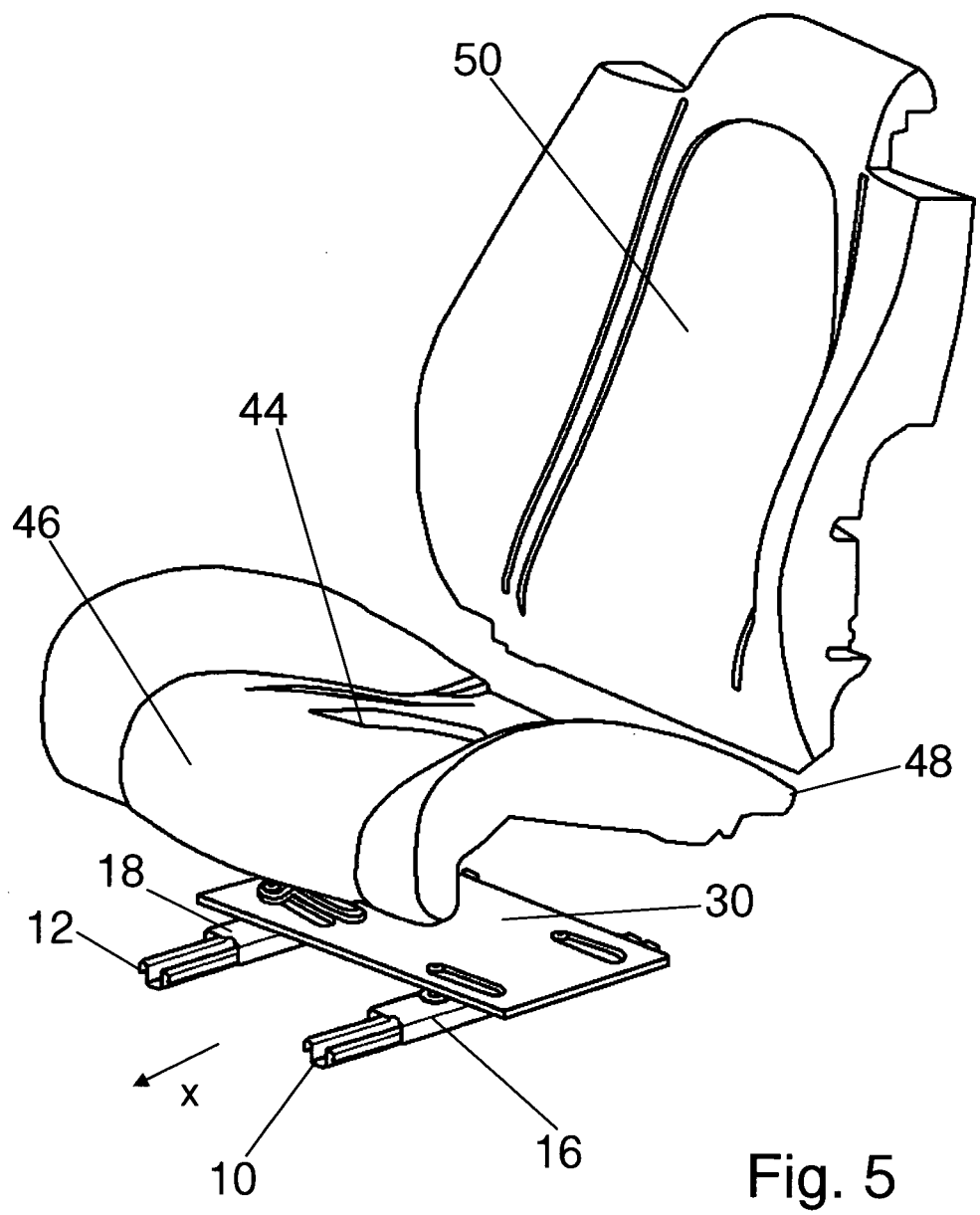
Figure 6:
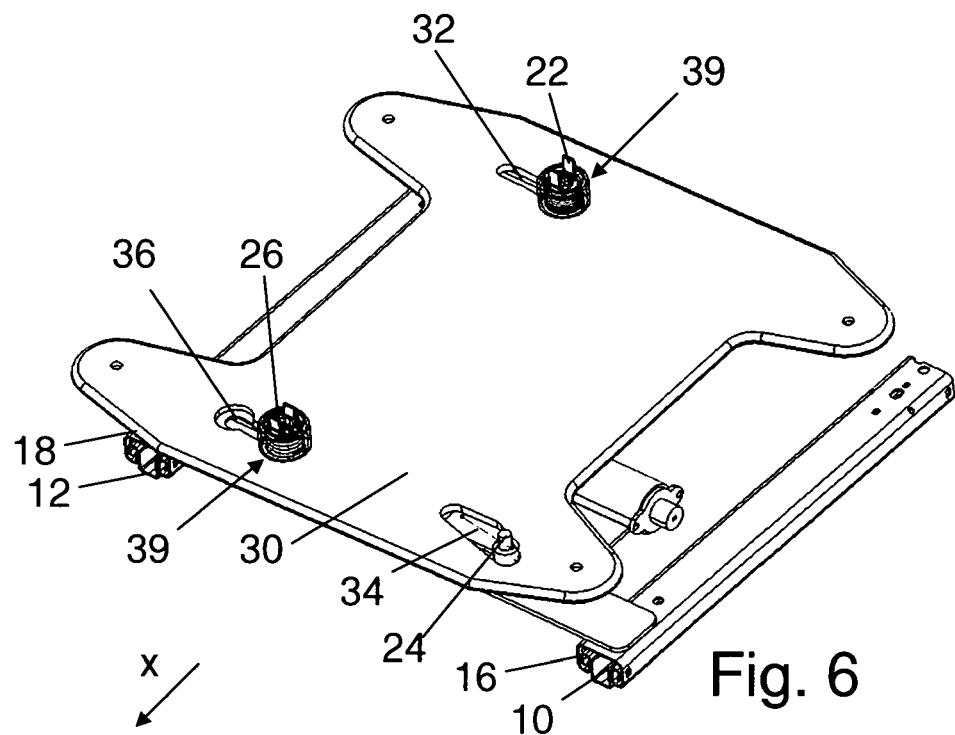
Figure 7:
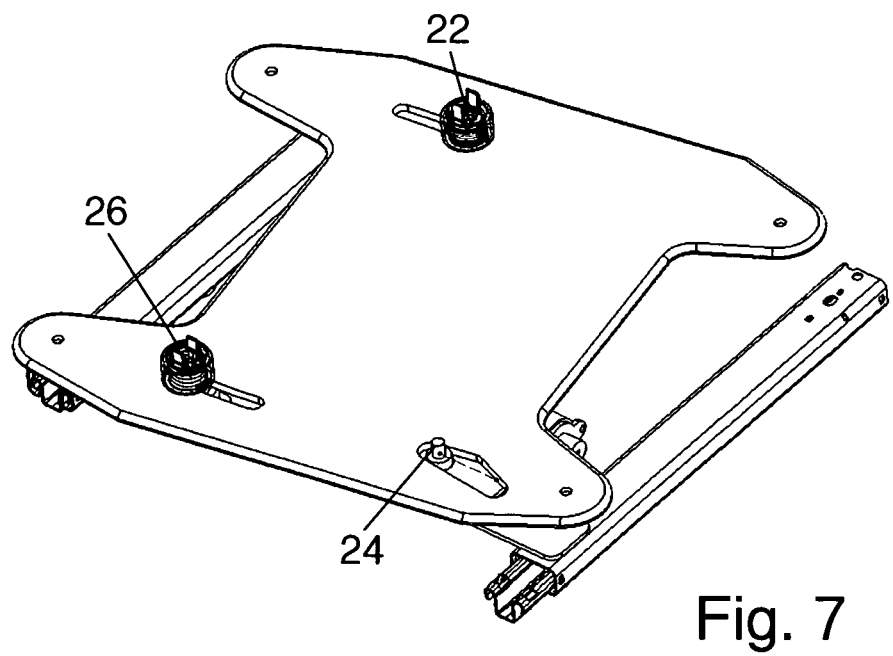
Figure 8:
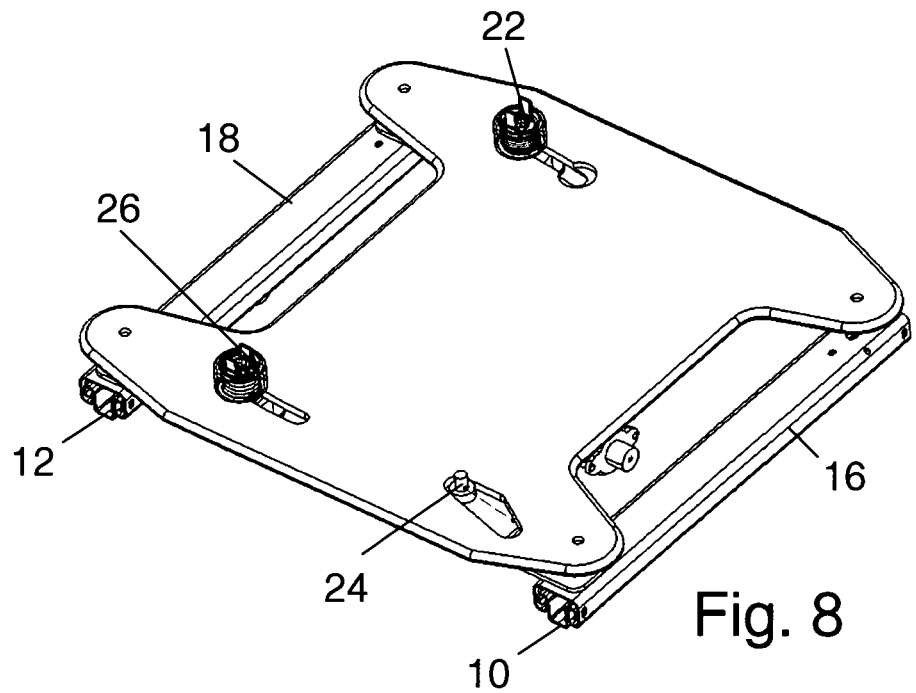
Figure 9:
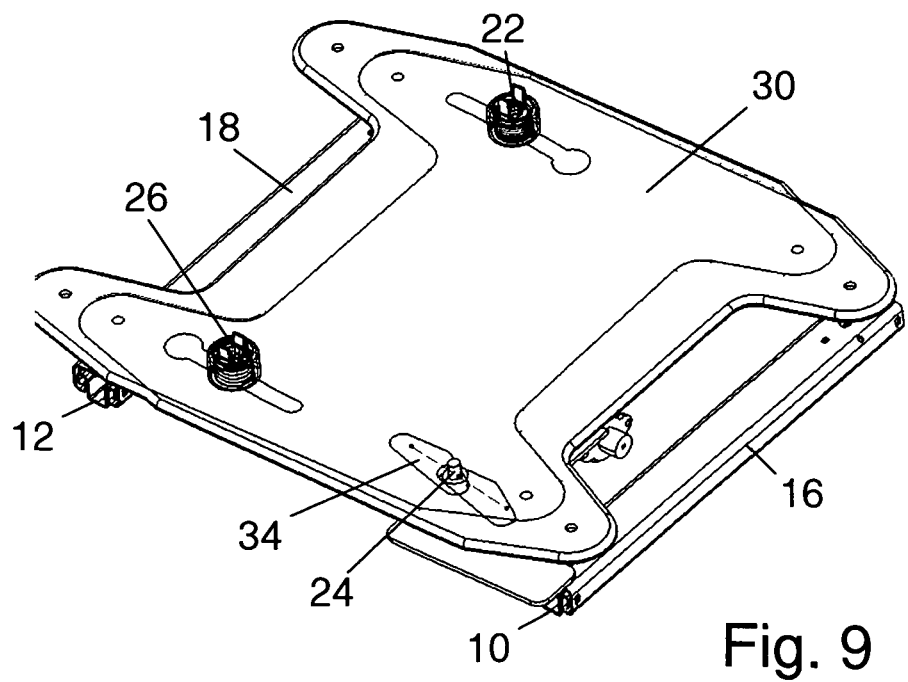
Figure 10:
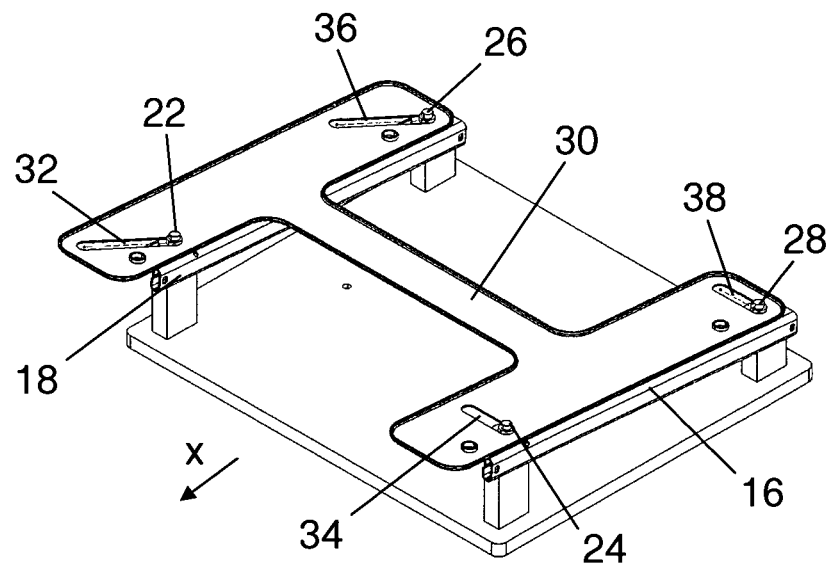
Figure 11:
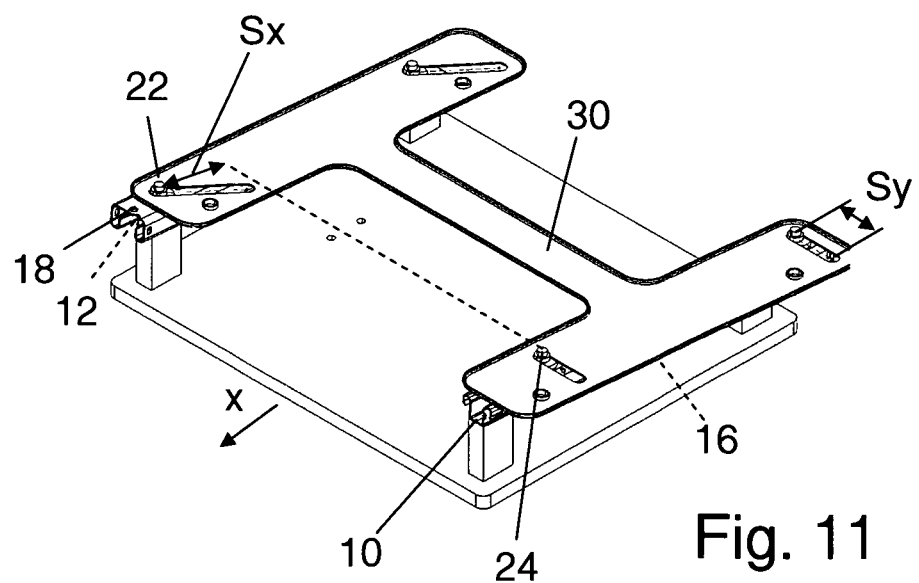
Figure 12:
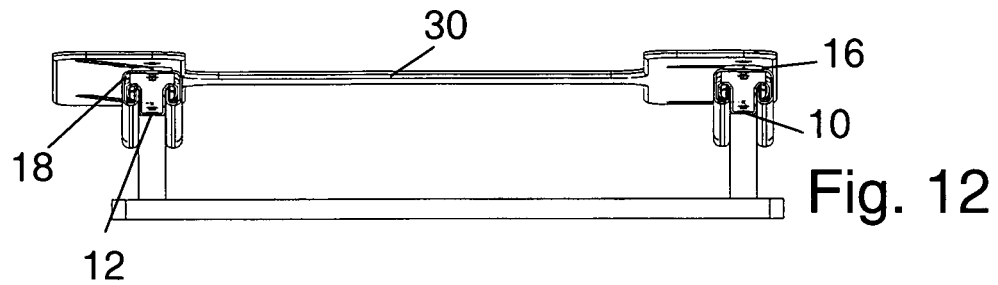
Figure 13:
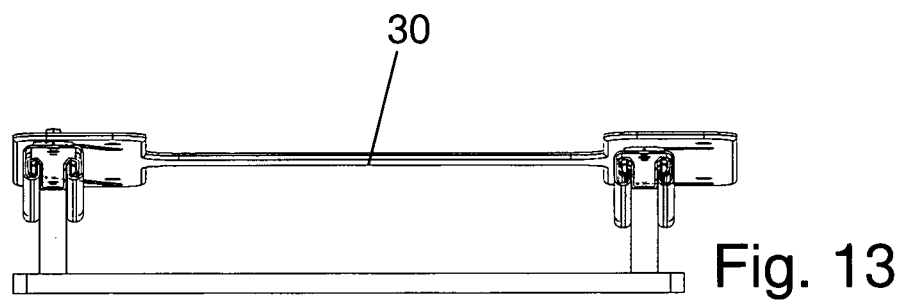
Figure 14:
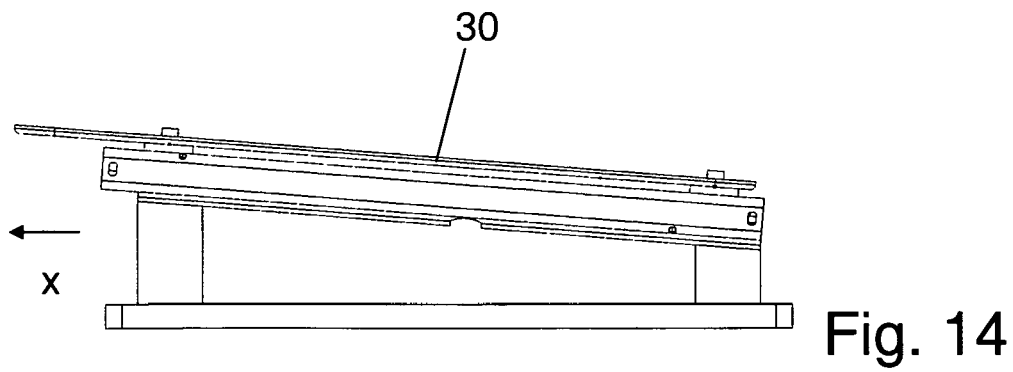
Figure 15:
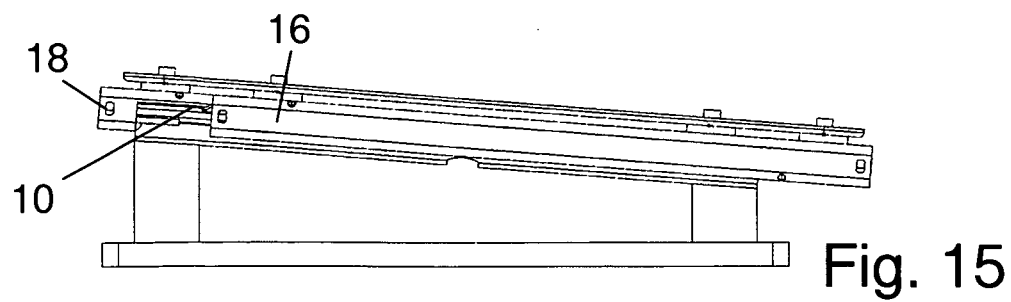
Figure 16:
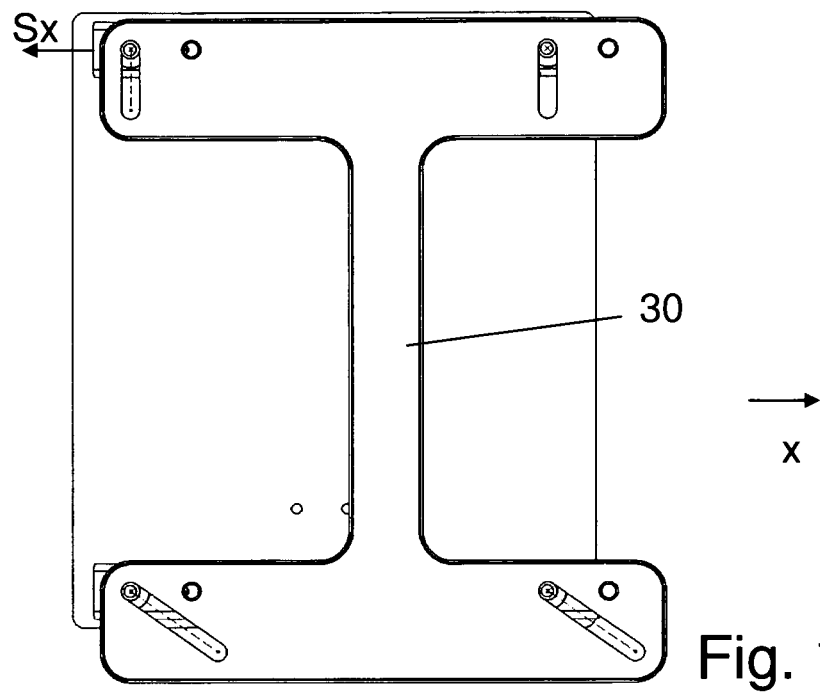
Figure 17:
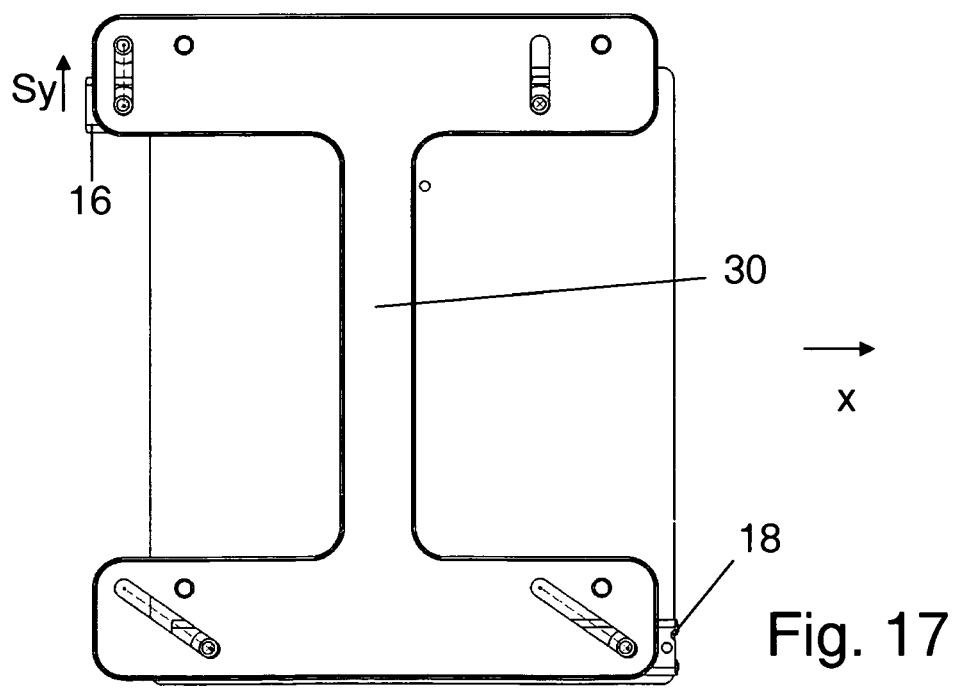
Figure 18:
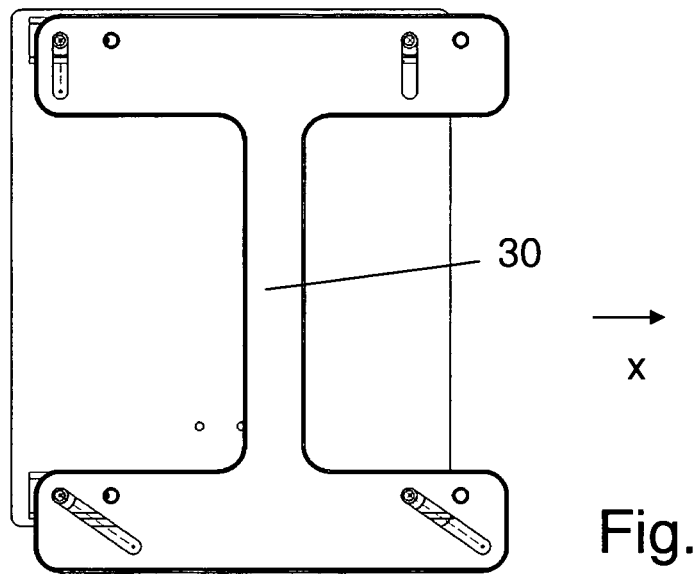
Figure 19:
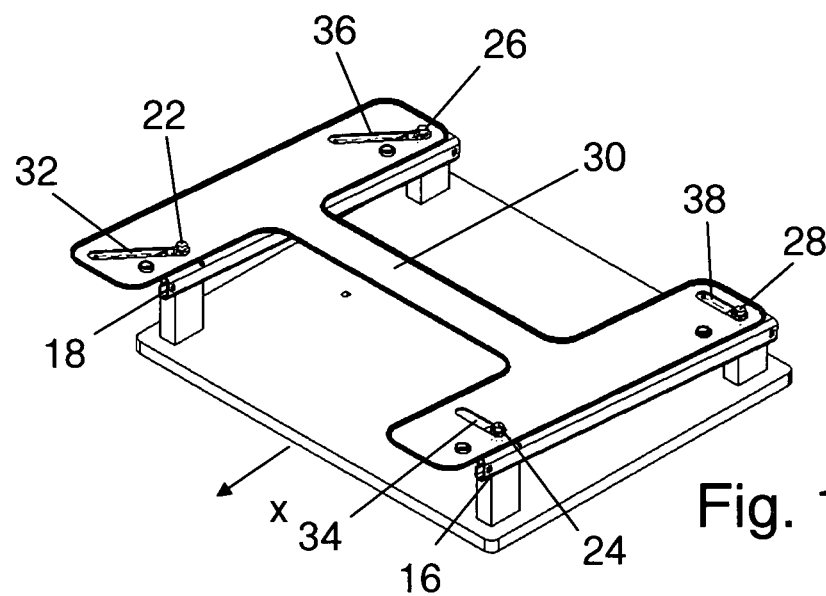
Figure 20:
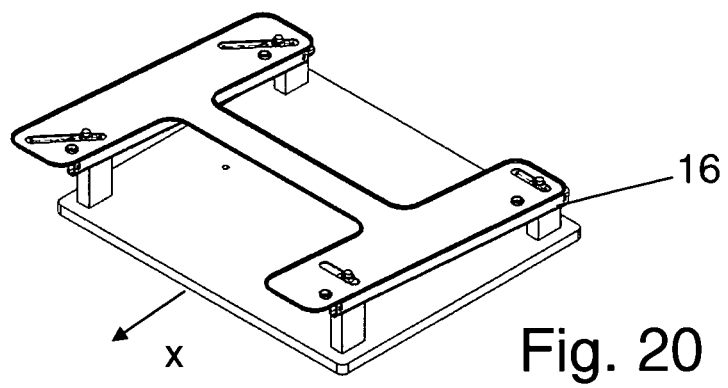
Figure 21:
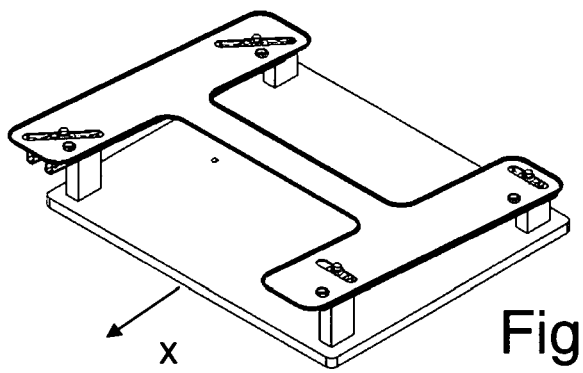
Figure 22:
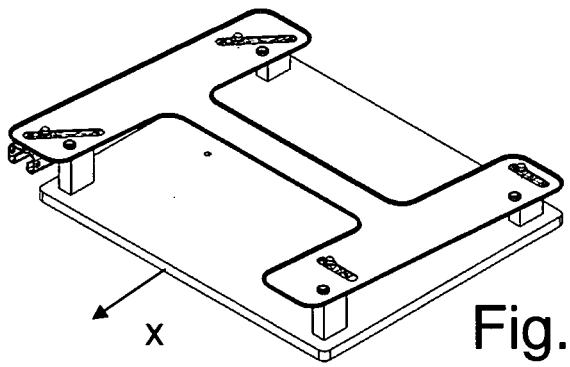
Figure 23:
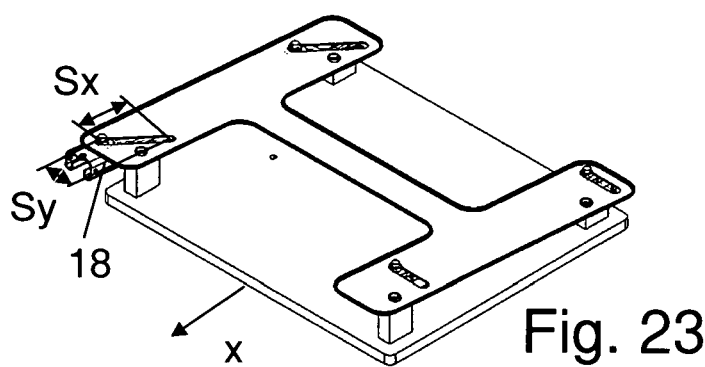

Several exemplary embodiments are described in more detail hereinafter with reference to the drawings, in which:

FIG. 1 shows a substructure of a vehicle seat according to the invention, according to the first exemplary embodiment, FIG. 2 shows the substructure shown in FIG. 1 with the rotated support after the first rotation has taken place, FIG. 3 shows the substructure shown in FIG. 1 with the rotated support after an intermediate step for unlocking the second pivot pin, FIG. 4 shows the substructure shown in FIG. 1 in the laterally displaced end position, FIG. 5 shows a vehicle seat shown in an exploded view in the normal position of use, FIG. 6 shows a substructure of a vehicle seat according to the invention according to the second exemplary embodiment, FIG. 7 shows the substructure shown in FIG. 6, with the rotated support after the first rotation has taken place, FIG. 8 shows the substructure shown in FIG. 6 in the laterally displaced end position, FIG. 9 shows a superimposed view of the initial and end positions according to the second exemplary embodiment, FIG. 10 shows a perspective view of a substructure of a vehicle seat according to the invention, according to the third exemplary embodiment in the position—when viewed in the direction of travel—arranged to the side and to the right (starting position), FIG. 11 shows the substructure according to the third exemplary embodiment in the position displaced to the side to the left (end position), FIG. 12 shows a front view of the substructure of FIG. 10,
FIG. 13 shows a front view of the substructure of FIG. 11,
FIG. 14 shows a side view of the substructure of FIG. 10,
FIG. 15 shows a side view of the substructure of FIG. 11,
FIG. 16 shows a plan view of the substructure of FIG. 10,
FIG. 17 shows a plan view of the substructure of FIG. 11,
FIG. 18 shows a plan view of the substructure according to the fourth exemplary embodiment in the position—viewed in the direction of travel—arranged to the side to the right (starting position), FIG. 19 shows a perspective view of the substructure of FIG. 18, FIG. 20 shows a perspective view of the substructure of FIG. 18 in a first intermediate position, FIG. 21 shows a perspective view of the substructure of FIG. 18 in a second intermediate position, FIG. 22 shows a perspective view of the substructure of FIG. 18 in a third intermediate position, and FIG. 23 shows a perspective view of the substructure of FIG. 18 in the end position arranged to the side to the left.

In FIG. 1 a substructure of a vehicle seat according to the invention is shown. A first lower rail 10 and a second lower rail 12 are fastened parallel to one another to a vehicle floor (fixed to the vehicle structure). A first upper rail 16 is movably guided in the first lower rail 10. Similarly, a second upper rail 18 is movably guided in the second lower rail 12. The direction of movement of the upper rails 16, 18 relative to the lower rails 10, 12 is denoted as the longitudinal direction.

In this example, the longitudinal direction extends parallel to the direction of travel. The longitudinal direction in the drawings is denoted in all exemplary embodiments by the arrow x. The upper rails 16, 18 are thus displaceable in the direction of travel and counter to the direction of travel. It is also conceivable to arrange the lower rails 10, 12 obliquely or inclined relative to the direction of travel. In this case, the upper rails 16, 18 are displaceable obliquely or inclined relative to the direction of travel.

A support 30 (fixed to the seat structure) bears against the upper rails 16, 18 and is mounted thereon in a manner described below. A seat cushion 44 is mounted on the support 30. The support 30 in this example takes the form of a planar plate which extends substantially in the longitudinal direction and in a direction extending perpendicular (and horizontally) thereto, denoted as the transverse direction.

By the synchronous displacement of the first upper rail 16 and the second upper rail 18 relative to the lower rails 10, 12, the support 30 is displaced in the longitudinal direction.

A direction running perpendicular to the longitudinal direction and perpendicular to the transverse direction is denoted hereinafter as the vertical direction.

The support 30 comprises a first recess 32 through which a first pin 22 fastened to the second upper rail 18 protrudes, the center axis thereof forming a first rotational axis.

Furthermore, the support 30 comprises a second recess 34 in the form of a sliding track through which a second pin 24 fastened to the first upper rail 16 protrudes as a sliding block. The second recess 34 in this example takes the form of a linear slot extending in the transverse direction, having a width corresponding to the diameter of the second pin 24. The second recess 34 may also extend obliquely to the transverse direction. A different shape is also conceivable, for example, a curved shape. It is also conceivable that the second recess 34 extends as far as the edge of the support 30, whereby an outwardly open fork-shaped arrangement results, in which the second pin 24 is guided.

The support 30 further comprises a third recess 36 in the form of a sliding track, through which a third pin 26 fastened to the second upper rail 18 protrudes as a sliding block. The third recess 36 takes the form of a slot in the shape of a circular segment having a width corresponding to the diameter of the third pin 26. The radius of said circular segment corresponds to the distance from the center axis of the pivot pin 22 to the center axis of the third pin 26.

The support 30 also comprises a fourth recess 38 in the form of a sliding track through which a fourth pin 28 fastened to the first upper rail 16 protrudes as a sliding block. The fourth recess 38 takes the form of a curved slot having a width corresponding to the diameter of the fourth pin 28.

The center axes of the pins 22, 24, 26, 28 extend parallel to one another in the vertical direction. The recesses 34, 36, 38 are designed so that with a displacement of the first upper rail 16 relative to the second upper rail 18 in the longitudinal direction a rotation of the support 30 about the center axis of the first pin 22 is possible. In this case, during the rotational movement, the first pin 22 is positioned in a stationary manner at one end of the recess 32 configured as an arcuate curved track by a locking mechanism 39, and rotatably held in this position.

A position reached by such a displacement of the first upper rail 16 relative to the second upper rail 18 is shown in FIG. 2. The support 30 has in this case undergone a rotation relative to the position shown in FIG. 1 about the center axis of the first pin 22 extending in the vertical direction, which forms the first rotational axis.

In an intermediate step after the rotational movement has taken place, the locking of the first pin 22 is released so that said pin is displaceable within the first recess 32. To this end, the locking device 39 is moved from its first end position into the second end position, so that now the third pin 26 is rotatably held in the current end position, whilst the first pin 22 is able to move along the first recess 32.

The locking device 39 is present as an elongated bar which is displaceable in a direction guided by a guide formed on the support 30 in a direction which is defined by the end position of the center axis of the first pin 22 in the first recess 32 at the end of the first rotational movement and the starting position of the center axis of the third pin 26 in the third recess 36 before the start of the second rotational movement. Curved tracks are provided at the end regions of the bar, said curved tracks in each case having a short linear region extending parallel to the guide direction as well as two circular arc-shaped regions extending in each case in a direction perpendicular to said region extending in a linear manner, wherein the two circular arc-shaped regions in each case extend on different sides of the bar and have a radius which corresponds to the distance from the outer end of the linear region as far as the inner end of the second linear region.

A second rotational movement follows the intermediate step of releasing and relocking the locking device 39. This second rotational movement takes place in the opposing direction to the first rotational movement and is carried out over the same rotational angle as the first rotational movement.

In the present case, the second upper rail 18 is in the same relative position to the second lower rail 12 during the entire movement. The first upper rail 16 alters its relative position to the first lower rail 10 during the first rotational movement in the form of a longitudinal displacement to the rear and during the second rotational movement in the form of a longitudinal displacement to the front, wherein the absolute lengths of the two longitudinal displacements correspond to one another.

In principle, it is naturally also possible for the displacement to be superimposed by a "normal" longitudinal displacement of the vehicle seat.

A first motor, which is arranged in the vehicle floor, is provided for driving the first upper rail 16. In addition, a second motor which is also arranged in the vehicle floor is provided for driving the second upper rail 18. The motors are designed, for example, as electronically commutated or brushed DC motors. The motors are able to be controlled independently of one another.

It is also conceivable to arrange the motors at different points, for example on the vehicle floor or even fixed to the upper rails. It is also conceivable to provide just one motor for driving both upper rails 16, 18, wherein in this case one respective coupling which may be connected and disconnected is provided for each upper rail 16, 18.

In an alternative embodiment, the motors may also be dispensed with, wherein the upper rails 16, 18 may be manually displaced. In this case, each of the upper rails 16, 18 has a separate lockable locking device.

In FIG. 5, a vehicle seat according to the invention is shown in the position of use. The exemplary embodiment shown here refers to a vehicle seat of a left-hand drive vehicle. The longitudinal direction defined by the lower rails 10, 12 corresponds in this case at least approximately to the direction of travel.

A seat cushion 44 is fastened onto the support 30, said seat cushion having a front end 46 in the longitudinal direction and a rear end 48 in the longitudinal direction. A backrest 50 is arranged in the region of the rear end 48 of the seat cushion 44. The seat cushion 44 and the backrest 50 form a seat shell. In the position of use, the front end 46 of the seat cushion 44 faces approximately in the direction of travel and the rear end 48 of the seat cushion 44 faces approximately counter to the direction of travel.

A movement of an upper rail 16, 18 in the direction of the front end 46 of the seat cushion 44 corresponds, therefore, to a movement approximately in the direction of travel and is denoted hereinafter as the forward movement. A movement of an upper rail 16, 18 in the direction of the rear end 48 of the seat cushion 44 corresponds to a movement approximately counter to the direction of travel and is denoted hereinafter as the rearward movement.

In the first exemplary embodiment, the first upper rail 16 and the first lower rail 10 viewed in the direction of travel are located to the left of the second upper rail 18 and the second lower rail 12. The second upper rail 18 and the second lower rail 12 thus face the center of the vehicle, the first upper rail 16 and the first lower rail 10 face a vehicle door, not shown here.

By displacement of the first upper rail 16 relative to the first lower rail 10 in the rearward direction, with simultaneous securing of the second upper rail 18 relative to the second lower rail 12, the support 30 undergoes a rotation about an axis extending in the vertical direction, namely counterclockwise. The seat cushion 44 and the backrest 50 are subjected to the same rotation, whereby the front end 46 of the seat cushion 44 moves toward the vehicle door.

In this rotated position of the vehicle seat, for example, it is possible for the driver to climb into the vehicle onto the driver's seat in a simple manner.

The first counterclockwise rotation described here of the vehicle seat is naturally also able to be implemented by other movements of the upper rails 16, 18, for example by a displacement of the second upper rail 18 in the forward direction with simultaneous securing of the first upper rail 16 and with simultaneous displacement of the first upper rail 16 in the rearward direction and the second upper rail 18 in the forward direction.

A rotation of the vehicle seat counterclockwise takes place when the first upper rail 16 moves relative to the second upper rail 18 in the rearward direction.

A simultaneous displacement of the first upper rail 16 in the rearward direction and the second upper rail 18 in the forward direction additionally provides the advantage that the disclosed rotated position from the position of use is achieved in the minimum amount of time.

The rotation of the seat cushion 44 together with the backrest 50 back into the normal orientation, with simultaneous displacement in the lateral direction, takes place in the direction of the center of the vehicle, by means of said second clockwise rotational movement about the axis which is formed by the center axis of the third pin 26.

Due to the arrangement and dimensions of the recesses, the substructure shown in FIGS. 1-4 is only suitable for a counterclockwise rotation from the position of use and/or a lateral displacement in one direction.

For implementing a clockwise rotation of a vehicle seat from the position of use, which for example is desired for a passenger seat, and/or a lateral displacement in the opposing direction, the support 30 and the locking mechanism 39 may be designed to be mirror-symmetrical.

A vehicle seat may also be configured such that a first clockwise rotation is possible from the position of use as well as a first counter-clockwise rotation. Thus, a displaceability in both lateral directions may also be accordingly implemented.

In the substructure shown in FIGS. 1-4, in the position of use the second pin 24 bears against one end of the second recess 34, the third pin 26 bears against one end of the third recess 36 and the fourth pin 28 bears against one end of the fourth recess 38. By designing the first recess 32, the second recess 34, the third recess 36 and the fourth recess 38 such that in the (central initial) position of use, the first pin 22 is in a central region of the first recess 32, the second pin 24 is in a central region of the second recess 34, the third pin 26 is in a central region of the third recess 36 and the fourth pin 38 is in a central region of the fourth recess 38, a clockwise and counter-clockwise rotation of the vehicle seat from the position of use is possible. After the first rotation has taken place in the first rotational direction, the second pin 24 is secured in the corresponding end position in the second recess 34 and the second rotational movement in the opposing direction to the first rotational movement takes place about the second pin 24. Thus a lateral displaceability is provided in both directions.

In FIGS. 6-9, an alternative embodiment of a substructure of a vehicle seat, in particular a driver's seat, is shown in the position of use, in intermediate positions and in a laterally displaced position as the second exemplary embodiment. Elements which are the same or have the same function are in this case denoted by the same reference numerals as corresponding elements of the first exemplary embodiment.

The substructure according to the second exemplary embodiment comprises two lower rails 10, 12 and two upper rails 16, 18, as does the substructure shown in FIGS. 1-5. The second upper rail 18—similar to the first exemplary embodiment—has a first pin 22 and a third pin 26. The first upper rail 16—in contrast to the first exemplary embodiment—has only one second pin 24. A substantial difference between the first and second exemplary embodiments is the locking mechanism 39, which according to the second exemplary embodiment is formed by two compression springs, in each case rotatably holding the corresponding pins 22 and 26.

A support 30 bears against the upper rails 16, 18 and is mounted thereon and guided by pins 22, 24 and 26. Similar to the support 30 shown in FIG. 1, the support 30 comprises a first recess 32, a second recess 34 and a third recess 36. The fourth recess is dispensed with, as is the fourth pin. In this case, the first pin 22 passes through the first recess 32, the second pin 24 passes through the second recess 34 and the third pin 26 passes through the third recess 36.

The function of the individual pins in connection with the corresponding recesses corresponds in principle to that of the first exemplary embodiment, wherein the first pin 22 is arranged to the rear, so that when moving the first upper rail 16 relative to the first lower rail 10 to the rear, a first clockwise rotational movement takes place about the first pin 22. After completing this rotational movement, the compression spring acts on the first pin 22, so that the pin 22 is rotatably held, whilst the pin 26 which was hitherto rotatably held by a further compression spring is released. As a result, with a (rearward) movement of the first upper rail 16 relative to the first lower rail 10 to the front, a second rotational movement takes place about the third pin 26, whereby the vehicle seat is again set upright, but in a position which is laterally offset to the starting position (see FIG. 9).

Although not described in more detail above, with appropriate control of the movement of the first upper rail 16 relative to the second upper rail 18 which effects a rotational movement about the first pin 22, and with a suitable rearward movement which effects said second rotational movement about the third pin 26, in principle any lateral displacement of the vehicle seat may also be effected. In this case, however, it has to be possible to secure the pins 22 and 26 rotatably within the recess 32 and/or 36 at any point.

According to the third and fourth exemplary embodiment, the seat structure is displaced laterally relative to the rails by a simple forward or rearward movement of one of the upper rails relative to the other upper rail. In this case, the relative starting position of the upper rails to one another is different from the relative end position thereof. For clearer understanding, elements which are the same or have the same function are denoted by the same reference numerals as in the exemplary embodiments described above.

Hereinafter, with reference to FIGS. 10 to 17, the third exemplary embodiment is described in more detail. In this case, corresponding to the first exemplary embodiment, a first lower rail 10 and a second lower rail 12 are fastened parallel to one another to a vehicle floor (fixed to the vehicle structure), wherein the lower rails 10 and 12 in the present case are arranged obliquely to the vehicle floor but a parallel arrangement is also possible. A first upper rail 16 is movably guided in the first lower rail 10. Also, a second upper rail 18 is movably guided in the second lower rail 12. The direction of movement of the upper rails 16, 18 relative to the lower rails 10, 12 is denoted as the longitudinal direction. The upper rails 16, 18 are displaceable in the direction of travel as well as counter to the direction of travel, wherein the seat height is slightly altered automatically.

A support 30 (fixed to the seat structure) bears against the upper rails 16, 18 and is mounted thereon in a manner described below. A seat cushion 44 is mounted on the support 30. The support 30 in this example takes the form of a planar, H-shaped plate which extends with its limbs substantially in the longitudinal direction and centrally thereto, in a direction extending perpendicular thereto (and horizontally) denoted as the transverse direction.

By synchronous displacement of the first upper rail 16 and the second upper rail 18 relative to the lower rails 10, 12, the support 30 is displaced in the longitudinal direction.

The support 30 has a first recess 32 in the form of a linear slot arranged obliquely to the longitudinal direction, through which a first pin 22 fastened to the second upper rail 18 protrudes, the center axis thereof forming a first axis. In this case, the slot substantially has a width which corresponds to the diameter of the first pin 22.

The support 30 also has a second recess 34 in the form of a slot, through which a second pin 24 fastened to the first upper rail 16 protrudes. The second recess 34 in this example takes the form of a slot extending in a linear manner, which is arranged perpendicular to the longitudinal direction having a width corresponding to the diameter of the second pin 24. The second recess 34 thus extends obliquely to the first recess 32.

The support 30 also has a third recess 36, through which a third pin 26 fastened to the second upper rail 18 protrudes. The third recess 36 has a shape corresponding to the first slot and is arranged parallel thereto. It has a width corresponding to the diameter of the third pin 26.

The support 30 also has a fourth recess 38, through which a fourth pin 28 fastened to the first upper rail protrudes. The fourth recess 38 has a shape corresponding to the second slot and is arranged parallel to said slot. It has a width corresponding to the diameter of the fourth pin 28.

The center axes of the pins 22, 24, 26, 28 extend parallel to one another, perpendicular to the plane of the support 30. The recesses 32, 34, 36, 38 are designed so that with a displacement of the first upper rail 16 relative to the second upper rail 18 in the longitudinal direction, in the present case with a displacement thereof to the rear from the starting position, with a parallel arrangement of the upper rails 16, 18 as shown in FIG. 10, a lateral displacement of the support 30 from right to left is possible, wherein the directional information refers to a vehicle seat oriented to the front relative to the normal direction of travel of the vehicle. The "forward" direction of travel is indicated in FIG. 10 by an arrow on the detail shown of the vehicle structure.

According to the third exemplary embodiment, as is visible from FIGS. 10 and 11, in the case of a displacement of the first upper rail 16 to the rear, the support 30 is moved to the rear and to the left. The maximum rearward movement Sx of the left-hand first upper rail 16 is defined by the length of the obliquely arranged receivers 32, 36 on the side of the right-hand second upper rail 18. The rearward movement is carried out by a rearward movement of the rail which has been moved, i.e. a rearward movement of the first upper rail 16.

The lateral movement which in the present case, with a displacement Sy from right to left, is also associated with said rearward movement over the path Sx and, with a (rearward) displacement from left to right, is associated with a corresponding forward movement of the vehicle seat, may naturally also be carried out during a longitudinal adjustment of the vehicle seat. Only the relative movement of the left-hand upper rail to the right-hand upper rail is relevant for the lateral displacement.

A reverse outward movement is naturally also possible—in particular for the seat on the other vehicle side—for which the entire arrangement is configured mirror—symmetrically to the central longitudinal plane so that, with a rearward movement of the right-hand upper rail, a movement is possible from an inner starting position (for example relative to a vehicle seat installed on the right in the vehicle) to the right, i.e. to the outside (and to the rear).

The fourth exemplary embodiment shown from FIG. 18 onwards differs from the third exemplary embodiment only in that the actuation of the lateral displacement does not take place via the first upper rail 16 with the recesses 34, 38 arranged perpendicular to the longitudinal direction but via the second upper rail 18 with the recesses 32, 36 arranged obliquely to the longitudinal direction. By moving the second upper rail 18 forward over the path Sx, the support 30 is (only) displaced to the left in the lateral direction as a result of the oblique arrangement of the recesses 32, 36, as a whole over the path Sy, as indicated in FIG. 23. A displacement of the seat in the longitudinal direction may thus be avoided by an exclusive actuation of the second upper rail 18.

According to the third and fourth exemplary embodiment, the obliquely-arranged recesses 34, 38 are arranged at an angle of approximately 45° to the longitudinal direction (x-direction), but the angle may also differ therefrom and, in particular, be in a range of 30° to 60° relative to the longitudinal direction, depending on the desired (or achievable) ratio regarding the longitudinal displacement of the upper rail which has been moved. Curved portions are also possible, for example, in order to delay reaching the end position when the upper rail is moved at a constant speed.

According to the third and fourth exemplary embodiment, the pins may also be arranged on one side directly on the vehicle structure, i.e. one of the upper/lower rail pairs together with the motor may be dispensed with. In this case, the vehicle seat in the third exemplary embodiment is only displaceable over the path Sx in the longitudinal direction and at the same time over the path Sy in the transverse direction. In the case of the fourth exemplary embodiment, the vehicle seat is only displaceable in the transverse direction over the path Sy. This arrangement is, in particular, suitable for a second or third seat row which does not provide any longitudinal adjustability of the vehicle seats.

Although it has not been described above, the lateral movements described above of the vehicle seat may also be combined with a rotational movement which, for example, is produced by a conventional rotary support, so that disembarking from the vehicle may be facilitated, for example.

LIST OF REFERENCE NUMERALS

10 First lower rail
12 Second lower rail
16 First upper rail
18 Second upper rail
22 First pin
24 Second pin
26 Third pin
28 Fourth pin
30 Support
32 First recess
34 Second recess
36 Third recess
38 Fourth recess
39 Locking mechanism
44 Seat cushion
46 Front end of the seat cushion
48 Rear end of the seat cushion
50 Backrest
Sx Path in longitudinal direction
Sy Path in transverse direction

The invention claimed is:

1. A vehicle seat which may be moved from a starting position into a laterally offset end position and back again, wherein the vehicle seat is oriented in the same direction both in the starting position and in the end position, comprising:
a first upper rail which is movably guided in a first lower rail;
a second upper rail which is movably guided in a second lower rail;
a seat cushion; and
a seat cushion connection mechanism and a rail connection mechanism that movably mount the seat cushion on the first upper rail and the second upper rail,
wherein the seat cushion connection mechanism includes a support and the seat cushion is fastened and fixed to the support which bears against the first and second upper rails and is movably mounted thereon via the rail connection mechanism, wherein interaction between the support and the rail connection mechanism provides relative movement therebetween,
wherein the rail connection mechanism guides the seat cushion connection mechanism and causes lateral movement of the seat cushion relative to the first and second upper rails in response to:
a predetermined forward and then rearward movement of the first upper rail relative to the second upper rail, or
a predetermined rearward and then forward movement of the first upper rail relative to the second upper rail, or
a predetermined forward movement of the first upper rail relative to the second upper rail, or
a predetermined rearward movement of the first upper rail relative to the second upper rail.

2. The vehicle seat as claimed in claim 1, wherein the support on the second upper rail is rotatable mounted on the second upper rail for carrying out a first rotational movement in a first rotational direction about a first axis, and also for carrying out a second rotational movement which may be carried out chronologically after the first rotational movement, in a second rotational direction which opposes the first rotational direction, about a second axis which is positioned spaced apart from the first axis, and the two axes are oriented extending parallel to one another and in the vertical direction relative to the vehicle seat.

3. The vehicle seat as claimed in claim 2, wherein the first and the second rotational movements have the same angular range but run in opposing directions.

4. The vehicle seat as claimed in claim 2, wherein the rail connection mechanism comprises a first pin, a second pin, and a third pin,
wherein the support comprises:
a first recess through which the first pin fastened to the second upper rail protrudes,
a second recess through which the second pin fastened to the first upper rail protrudes, and
a third recess through which the third pin fastened to the second upper rail protrudes,
wherein the second and third recesses are formed as sliding tracks such that with a displacement of the first upper rail relative to the second upper rail in the longitudinal direction a rotation of the support is possible about the center axis of the first pin.

5. The vehicle seat as claimed in claim 4, wherein the second and third recesses are configured as sliding tracks such that with a rearward displacement of the first upper rail relative to the second upper rail in the longitudinal direction it is possible to rotate the support back around the center axis of the third pin.

6. The vehicle seat as claimed in claim 2, wherein during the first rotational movement the second upper rail is displaceable relative to the second lower rail to the rear, with regard to the normal orientation of the vehicle seat in a vehicle and during the second rotational movement is displaceable again to the front, back into the starting position, during which the vehicle seat is laterally displaceable by two rotational movements about different axes.

7. The vehicle seat as claimed in claim 1, wherein the at least one seat connection mechanism includes slotted recesses and the at least one rail connection mechanism includes sliding blocks, wherein the support is guided by sliding tracks formed by slotted recesses in combination with sliding blocks fixed to the upper rail, wherein the orientation of the sliding track(s) on the side of the first upper rail differs from the orientation of the sliding track(s) on the side of the second upper rail, and two sliding tracks corresponding to one another are formed on the side of the first and/or second upper rail and a total of at least three sliding tracks is provided.

8. The vehicle seat as claimed in claim 7, wherein the sliding tracks are arranged on the side of an upper rail perpendicular to the longitudinal direction of the upper rail, and in that the sliding tracks on the side of the other upper rail are arranged obliquely thereto.

* * * * *